Feb. 14, 1967 P. H. TAYLOR 3,303,856
CONTROLLED DIFFERENTIAL COMPRESSION DEVICE
Filed Sept. 16, 1963 2 Sheets-Sheet 2
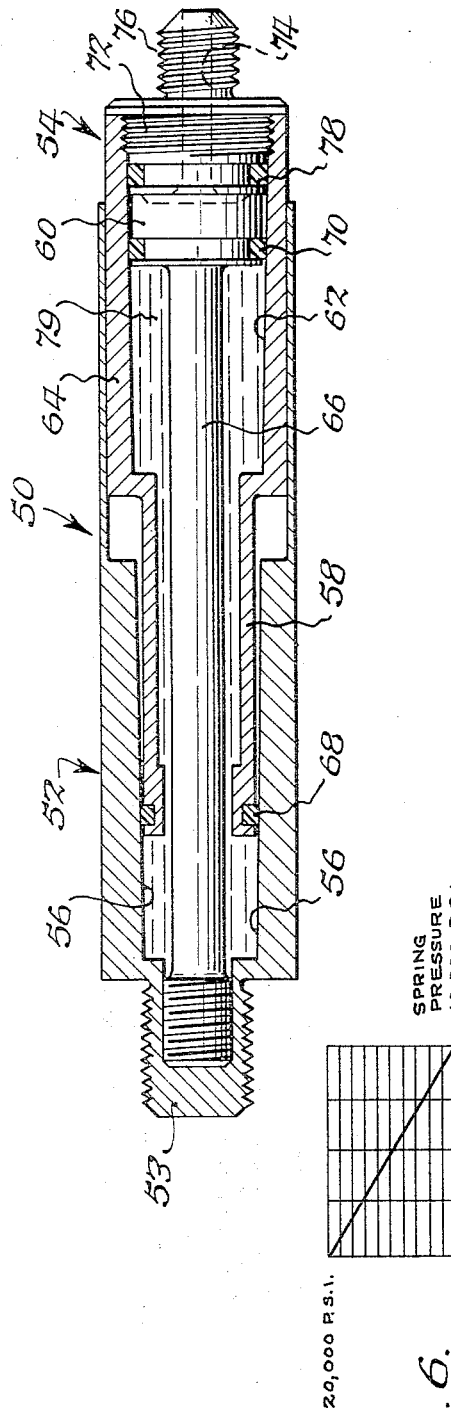
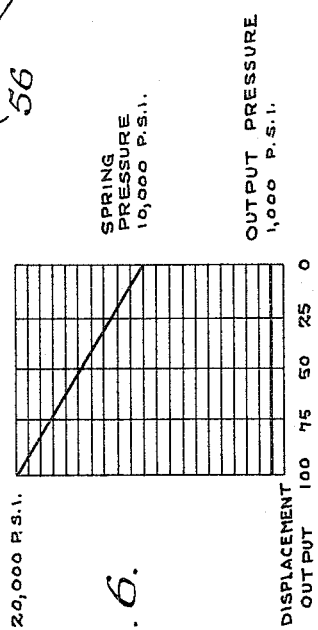
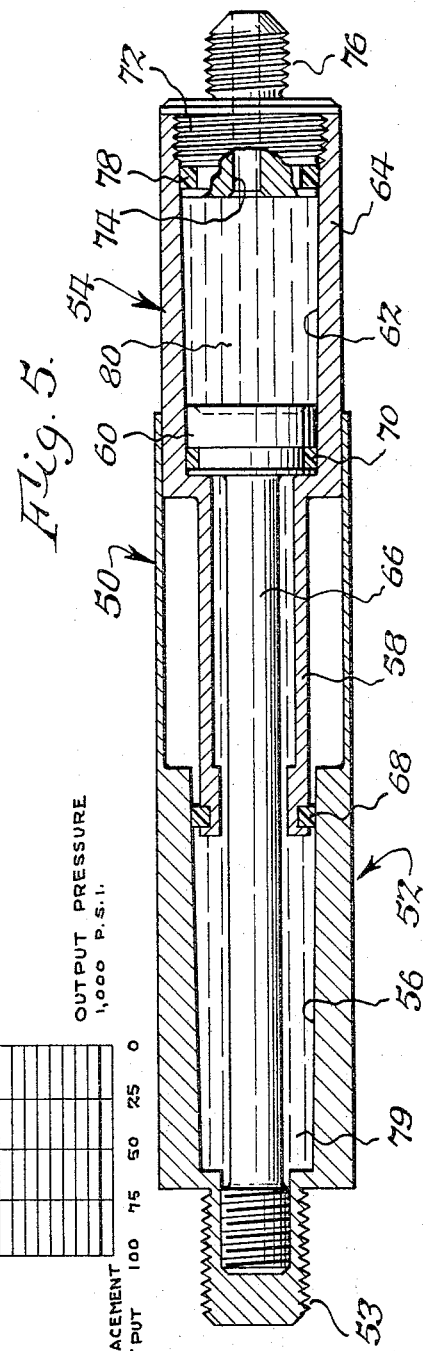
INVENTOR.
Paul H. Taylor
BY Byron, Hume,
Groen & Clement
Attorneys.

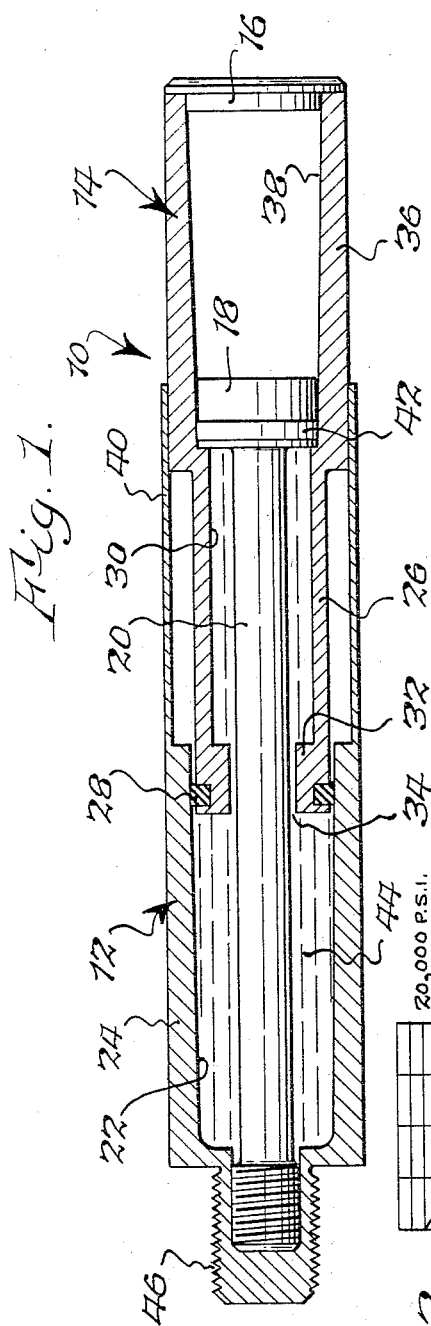
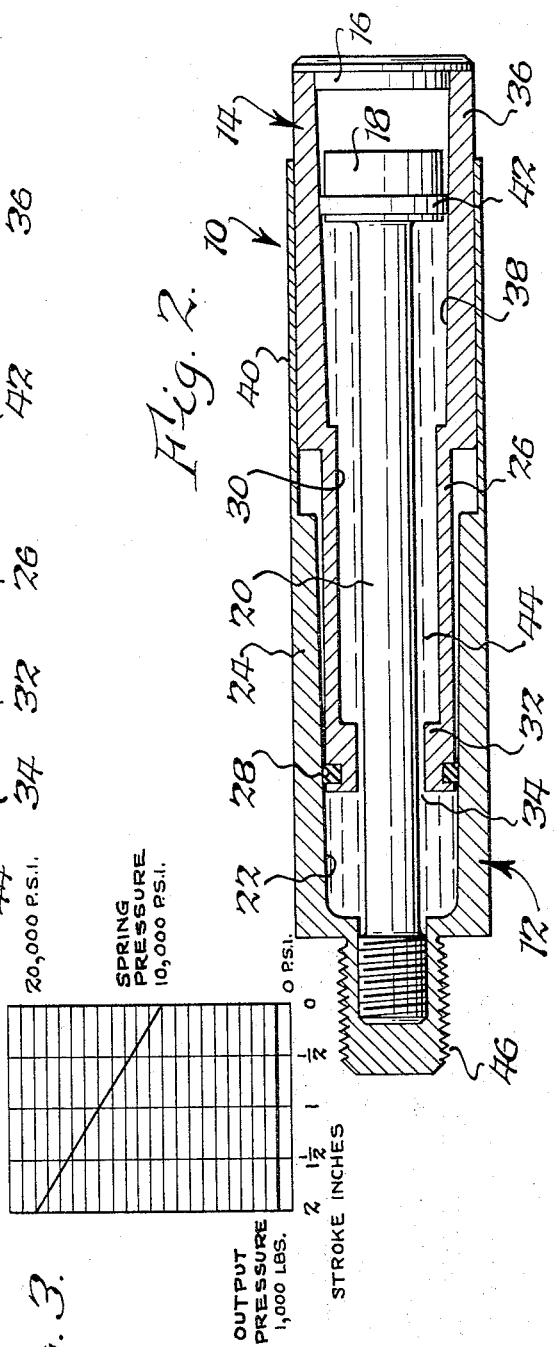

United States Patent Office 3,303,856
Patented Feb. 14, 1967

3,303,856
CONTROLLED DIFFERENTIAL
COMPRESSION DEVICE
Paul H. Taylor, Grand Island, N.Y., assignor to Tayco Developments, Inc., North Tonawanda, N.Y., a corporation of New York
Filed Sept. 16, 1963, Ser. No. 309,102
9 Claims. (Cl. 138—31)

This invention relates to compressible non-gaseous material devices achieving controlled pattern output. More particularly, the invention relates to mechanism for achieving controlled pattern output through modification of differential area liquid springs.

The basic principles of differential compression of non-gaseous materials are covered in my prior Patent No. 2,909,368 dated October 20, 1959, entitled, "Differential Area Liquid Springs." The present invention provides modified constructions utilizing these basic principles and achieving closely controlled pattern output whether that output be force exerted by a liquid spring or pressure exerted by a compressible liquid accumulator. As used hereafter in the specification and in the claims the term "liquid" is intended to cover all relatively compressible non-gaseous materials whether they be true liquids, semi-liquids or solids, as distinguished from gaseous materials.

The differential area principle permits the construction of liquid springs with very low spring rates. However, even with differential area springs, it has heretofore been impossible to alter the spring rate pattern for a given spring construction. In other words, for any given differential area a fixed spring rate was determined for any given compressible liquid. This inflexibility in spring rate was one of the limitations inherited, so to speak, from earlier liquid springs.

Because of this inflexible spring rate limitation, prior to the present invention, it was possible to achieve or closely approach constant compression force liquid springs only through the use of polymorphic compressible liquids. Polymorphic liquids are those which undergo change in form resulting in volume change at a substantially constant pressure. The constant compression force principle utilizing polymorphic materials is covered in my prior Patent No. 2,949,315 issued August 16, 1960, entitled "Vehicle Suspension and Power System." The use of polymorphic materials in liquid springs and accumulators is covered even more basically in my prior Patent No. 3,023,786, issued March 6, 1962, entitled, "Accumulator," and in my prior Patent No. 2,873,963, dated February 17, 1959, entitled, "Liquid Spring and Oleo Suspension for Aircraft and Vehicles," as well as in my prior Patent No. 2,909,368, mentioned above.

Even utilizing polymorphic materials, however, it has been difficult to achieve truly constant force output because of the fact that a finite time is required for polymorphic transition, as explained in my co-pending Serial No. 659,629 referred to above. Furthermore, the stroke of a polymorphic liquid spring in the polymorphic range is limited by the difference in displacement between the two polymorphic forms of the particular compressible polymorphic liquid used. An additional difficulty is presented because the pressure at which polymorphic transition occurs changes with change in temperature.

The problems in achieving constant output springs and accumulators in the liquid spring field are further compounded by the fact that the relative compressibility of various liquid decreases with increase in pressure. For example, a typical liquid spring silicone compresses 6.3% in volume when the pressure on the material is increased from zero to 10,000 p.s.i. (pounds per square inch). The same material compresses only 3.1% in volume when the pressure is increased from 10,000 p.s.i. to 20,000 p.s.i. The relative compressibility of this material progressively diminishes up to pressures of 200,000 p.s.i. Accordingly, even in liquid spring devices in which a straight line change in volume is provided with unit contraction or extension of the spring, the spring rate itself is not completely flat but is actually a curve due to the decreasing compressibility of the compressible liquid with increase in pressure.

In prior liquid spring devices, therefore, it has been necessary to carefully match the compressible material to the mechanical characteristics of the spring construction in order to achieve a desired spring rate according to the particular application. Even then, only one spring rate could be achieved so that there could be no effective control over the output pattern.

The liquid spring or compressible liquid accumulator devices of the present invention permit the achievement of very close control over the output pattern of the device through modification of the mechanical construction to provide a variable differential area. With this variable differential area construction there is no limit to the possible variations of output pattern.

Accordingly, it is an object of the present invention to provide a compressible liquid device achieving controlled pattern output.

Another object of the invention is to provide a differential area compressible liquid device utilized as an accumulator.

A further object is to provide a differential area compressible liquid device in which the output pattern is closely controlled.

Still another object of the invention is to provide an improved constant force output liquid spring.

A still further object of the invention is to provide an improved constant pressure output compressible liquid accumulator.

An overall object is to provide a variable differential area compressible liquid device.

Other objects, features and advantages will become apparent from the following detailed description taken in conjunction with the accompanying drawings, in which:

FIGURE 1 is a longitudinal sectional view of a liquid spring constructed according to the present invention to achieve constant force output throughout a predetermined stroke, with the spring shown in its normal extended position.

FIGURE 2 is a longitudinal sectional view of the liquid spring of FIGURE 1 showing the spring in its contracted, compressed position.

FIGURE 3 is a graphical illustration showing the liquid spring pressure and the output force plotted with respect to the stroke of the spring of FIGURES 1 and 2.

FIGURE 4 is a longitudinal sectional view of a compressible liquid accumulator constructed according to the present invention to achieve constant pressure output, with the accumulator shown in its extended, charged condition.

FIGURE 5 is a longitudinal sectional view of the accumulator of FIGURE 4 showing the accumulator in its contracted, discharged condition.

FIGURE 6 is a graphical illustration of the liquid spring pressure and the accumulator pressure output of the accumulator shown in FIGURES 4 and 5 plotted with respect to discharge displacement.

The liquid spring embodiment of the invention illustrated in FIGURES 1 and 2 of the drawings is generally designated by the reference numeral 10. The spring 10 includes a heavy-walled casing or cylinder 12 closed at one end and receiving a heavy-walled tubular piston member 14 in its opposite open end in telescoped relation. The outward end of the tubular piston member 14 is closed by means of a suitable plug 16 or the like, and the other end portion of the tubular piston member is reciprocably disposed within the cylinder member. A piston head 18 is reciprocably disposed in the tubular piston member 14 and is held in a fixed position with respect to the cylinder member 12 by means of an integral metering shank 20 which is threadedly secured at the closed end of the cylinder member in coaxial relation therewith.

The cylinder member 12 includes a bore 22 having a relatively heavy wall 24. An annular cylindrical nose portion 26 of the tubular piston member 14 is reciprocably disposed within the bore 22, and a suitable liquid spring seal 28 is carried by the forward end portion of the cylindrical nose 26 and engages the wall of the bore 22 in sliding sealing relation. The liquid spring seal 28 may be of any suitable construction, for example, the construction covered in my prior Patent No. 2,909,398, dated October 20, 1959, entitled, "Liquid Spring Seal." The cylindrical nose 26 has an internal bore 30 terminating at its forward end at an integral inturned metering head 32 providing a restricted annular metering passage 34 in conjunction with the metering stem 20 between the bore 22 of the cylinder member 12 and the bore 30 of the tubular piston member 14.

The rearward part of the piston member 14 comprises a cylindrical heel portion 36 integral with the cylindrical nose 26 but of larger external diameter, thus providing an externally stepped appearance to the tubular piston 14. Within the rearward cylindrical portion 36, a bore 38 is formed which connects with the bore 30 at one end and which is plugged by the plug 16 at its other end. The bore 38 is of larger diameter than the cylindrical bore 30 providing an internally stepped form to the tubular piston 14. The bore 38 between the piston head 18 and the plug 16 contains air only and it is not necessary that the plug 16 provide an airtight seal.

The cylinder member 12 includes an integral cylindrical forward skirt portion 40 which receives the outer cylindrical surface of the heel portion 36 of the tubular piston 14 in close fitting telescoping relation as shown. No seal is provided or required between the skirt 40 and the cylindrical portion 36.

The solid piston head 18 is reciprocably disposed within the bore 38 of the tubular piston 14 and is provided with a suitable liquid spring seal 42 which may also be constructed in accordance with my prior Patent No. 2,909,-398 mentioned above. In its normal position the piston head 18 abuts the shoulder formed between the bores 30 and 38, as illustrated in FIGURE 1.

The entire open space within the bore 22 of the cylindrical member 24 and the bores 30 and 38 of the tubular piston 14 between the liquid spring seals 28 and 42 is conveniently referred to as the liquid spring chamber. This chamber is completely filled with a suitable compressible liquid 44, for example, one of the compressible di-methyl siloxane liquids generally referred to as "silicones." It will be understood, however, that any suitable, relatively compressible liquid may be utilized. The compressible liquid 44 does not undergo polymorphic transition within the range of pressures encountered during operation of the spring.

The metering head 32, in conjunction with the metering shank 20, dampens compression and extension of the spring by forcing the compressible liquid to pass through the restricted metering passage 34 when moving between the bores 22 and 30. If desired, metering valve means can be provided as described in my prior Patent No. 2,909,368 in order to decrease the dampening in either direction to suit the purpose to which the spring is put. Of course, the amount of dampening can be decreased or dampening can be eliminated by increasing the area in the metering passage 34.

At its blind end, the cylinder member 12 is provided with an integral externally threaded stud 46 which may be used to secure the end of the cylinder member to one part of a mechanism (not shown) with which the spring is intended to be used. Another part of the mechanism may be engaged against the plug 16 at the other end of the spring 10, so that the spring will resiliently support the two parts of the mechanism with respect to one another.

With the exception of the seals 28 and 42, all of the elements described thus far are formed of rigid, tough materials such as high grade steel.

This liquid spring construction is of the differential area type disclosed and claimed in my prior Patent No. 2,909,368, noted above. According to the principles of that patent, the compression rate of the spring is dependent upon the relative size of the swept areas of the seals 28 and 42. As the spring is compressed from the FIGURE 1 position to the FIGURE 2 position, the seal 28 moves relative to the seal 42, so that as one of the seals advances to compress the liquid in the liquid spring chamber, the other seal retracts, tending to relieve the compression. The compression results from the difference between the swept areas of the seals since the volume reduction is equal to the differential area times the stroke.

Without more, the spring 10 would be a "standard" differential area liquid spring. If the swept area of the seal 28 is larger than the swept area of the seal 42, then the liquid is compressed as the spring is contracted, and the spring is referred to as a compression spring. If the seal 42 is larger in swept area than the seal 28, then the liquid within the spring is decompressed as the spring is contracted, and the spring is referred to as a tension spring. In either case, however, an increasing force is exerted by the spring as described thus far as the liquid within the spring is subjected to increasing pressure due to spring contraction or extension, as the case may be.

According to the present invention, however, the differential area construction is modified in the spring 10 in order to provide a controlled pattern output of spring force. This controlled pattern is achieved by providing a variable differential area of the seals 28 and 42. The differential area is varied by tapering the wall of the bore 22 and the wall of the bore 38 so that the swept area of the seal 28 decreases as the swept area of the seal 42 increases during the contraction stroke of the spring. In order to achieve this, the bores are formed with slight frusto-conical tapers as shown instead of being formed with cylindrical bores according to my prior invention.

The relative taper of the bores 22 and 38 depends upon the spring force output pattern desired and the compressibility characteristics of the particular compressible liquid being utilized. In the present instance, the output pattern is so controlled that a constant output force is exerted by the spring regardless of the relative position of the tubular piston 14 within the cylinder member 12. The differential areas of the seals are so matched that as the pressure within the spring goes up on the compression stroke, the differential area or net area difference between the seals goes down. The relationship is such that the product of differential area times the internal spring pressure is a constant throughout the stroke, this constant being the force required to contract the spring. This provides the desired constant output characteristic.

It will be noted that the constant output force is achieved strictly by mechanical means without the use of polymorphic liquids, and yet the desired force pattern is accomplished internally within the spring without necessitating the use of external levering or the like.

In a particular model of a spring as shown in FIGURES 1 and 2, a constant spring force of 1,000 lbs. is achieved in a spring having a two inch stroke, for example. The bores 22 and 38 of this model are so formed that with the spring in its fully extended position as shown in FIGURE 1, the seal 28 is approximately ten thousandths of an inch larger in diameter than the seal 42. At the end of the two inch stroke, with the spring in its contracted position as shown in FIGURE 2, the diameter of the seal 28 is contracted and the diameter of the seal 42 is expanded, such that the differential area is only half as great at the end of the stroke when the spring pressure has doubled.

Referring to the graphical illustration of FIGURE 3, the initial or pre-load compression in the liquid spring is seen to be 10,000 p.s.i., which, in this particular spring, provides an initial spring force of 1,000 lbs. tending to separate the cylinder member 12 and the tubular piston 14. As the spring is contracted, the liquid within the spring is compressed and the pressure increases. However, with the tapered wall construction, the differential area between the seals 28 and 42 decreases with the stroke. The increasing spring pressure acts against a differential area which decreases at a rate just sufficient that the spring force remains the same throughout the stroke of the spring. At the end of the two inch stroke the pressure within the spring is 20,000 p.s.i., but the differential area between the seals is only half that at the beginning of the stroke, so that the force exerted by the spring is still only 1,000 lbs.

In some instances, it may be desirable to provide a constant output force up to a certain contracted spring position and then to allow the output force to increase normally with continued contraction of the spring. This can be very readily accomplished by tapering the walls of the bores 22 and 38 to the extent required to cover the entire stroke between the positions illustrated in FIGURES 1 and 2 but to extend these bores thereafter cylindrically so that any over-contraction encounters the normal differential area compression wherein the spring force will thereafter increase with increase in contraction.

It will be understood that the amount of taper required is very slight and would be hardly discernible, but in order to better illustrate in the drawings, this taper is greatly emphasized.

In FIGURES 4 and 5 of the drawings another embodiment of the invention is illustrated. This embodiment comprises a compressible liquid accumulator generally designated by the reference numeral 50. The accumulator 50 includes a cylinder member 52 coacting with a telescoped tubular piston member 54.

The cylinder member 52 is provided with an internal bore 56 receiving a reduced diameter nose portion 58 of the tubular piston member 54. A solid piston head 60 is reciprocably disposed within an enlarged bore 62 formed within a heel portion 64 of the tubular piston, and the piston head 60 is secured in fixed relation with respect to the cylinder member 52 by means of a metering stem 66. The forward end portion of the tubular piston nose 58 carries a suitable liquid spring seal 68, and the piston head 60 carries a suitable liquid spring seal 70.

The bore 56 of the cylinder member 52 is slightly frusto-conically tapered, so that as the nose 58 of the tubular piston is telescoped within the bore, the diameter of the seal 68 decreases. The bore 62 of the tubular piston is also slightly frusto-conically tapered so that the diameter of the seal 70 increases as the accumulator is contracted in length.

The outward end of the tubular piston 54 is closed by a suitable threadably inserted plug 72. Instead of being a blind plug as the plug 16 of the first embodiment, however, the plug 72 contains a central passage 74 extending through an integral, externally threaded attachment nipple 76. A suitable static seal member 78 is disposed between the inward end portion of the plug 72 and the adjacent portion of the wall of the cylinder 62 in order to prevent leakage.

The nipple 76 is adapted to receive a suitable female (not shown) connecting with a hydraulic system of any type (not shown) for performing work through hydraulic pressure. For example, such a hydraulic system could be the hydraulic control system of a ballistic missile, the hydraulic actuating system of earth moving machinery, or any conceivable hydraulic system utilizing an accumulator.

The entire open space confined between the seals 68 and 70 is referred to as the liquid spring chamber. This chamber is completely filled with a suitable, relatively compressible liquid 79 which may be the same as or similar to the compressible liquid 44 of the first embodiment.

The entire open space in the bore 62 between the seal 70 and the plug 72 is referred to as the accumulator chamber. A relatively incompressible hydraulic fluid 80 is communicated through the passage 74 from the hydraulic system and completely fills this accumulator chamber.

The compressible liquid 79 and the hydraulic liquid 80 are so constituted that they do not undergo polymorphic transistion within the range of pressures encountered during operation of the accumulator 50.

Except for the difference in the plug 72 and the addition of the hydraulic fluid 80 the accumulator 50 may be much the same as the spring 10 of the previous embodiment. However, in the accumulator 50 the bores 56 and 62 are so proportioned that the diameter of the seal 70 is larger than the diameter of the seal 68. Accordingly, a tension spring is provided so that the normal position is as shown in FIGURE 5 with the end of the piston head 60 abutting the opposing end of the plug 72. As the accumulator is extended, the volume in the liquid spring chamber is reduced so that the compressible liquid 79 within the liquid spring chamber is compressed as the seals move toward each other.

In this embodiment of the invention, the accumulator 50 is "charged" or "cocked" by exerting a pressure in the hydraulic fluid 80 sufficient to cause the tubular piston 54 to move outwardly against the liquid spring force to the position shown in FIGURE 4. The relationship between the bores 56 and 62 is such that as the seals 68 and 70 move toward each other, the differential area between the seals decreases. At the same time, of course, the pressure of the compressible liquid 71 is increasing since the volume in the liquid spring chamber is decreasing. The taper of the walls 56 and 62 is such that the change in differential area matches the change in pressure, or, in other words, the product of liquid spring pressure times differential area remains constant throughout the stroke of the spring portion of the accumulator device 50. Since the product of pressure times differential area remains constant, the force tending to draw the tubular piston member 54 into the cylinder member 52 also remains constant throughout the stroke of the device.

It will be recognized that the pressure of the hydraulic fluid 80 within the accumulator chamber is dependent upon the magnitude of the force drawing the tubular piston member 54 into the cylinder member 52. Inasmuch as this force is constant, the pressure output from the accumulator chamber is also substantially constant, regardless of the position of the piston head 60 with respect to the plug 72. This is assuming, of course, that the conditions within the hydraulic system are such as to permit the application of a constant pressure.

If the spring force is absolutely constant, it will be seen that there is some slight tendency toward pressure increase in the accumulator chamber as the accumulator discharges inasmuch as the seal 70 is increasing in diameter. However, the effect of area change in the accumulator chamber is very small because the pressure is ordinarily only one tenth to one twentieth of the pressure in the liquid spring chamber, and, in addition, only one seal contributes to the change. This slight tendency can be readily eliminated by adjusting the differential area change very slightly to compensate.

FIGURE 6 provides a graphical illustration of a typical differential compression accumulator, as illustrated in FIGURES 4 and 5. When the accumulator is in its collapsed, charged condition, the pressure of the compressible liquid 79, referred to as the "spring pressure," is equal to 20,000 p.s.i., and by reason of the piston area relationship, this provides 1,000 p.s.i. pressure in the hydraulic fluid 80, referred to as the "output pressure."

These are both plotted against the volume in the accumulator chamber referred to as "output displacement."

As part of the hydraulic fluid 80 under pressure is fed into the hydraulic system and the spring extends, the spring pressure decreases as illustrated in FIGURE 6. At the same time, however, the differential area is increased the required amount to maintain the spring force output constant, which maintains the accumulator pressure output constant. In this particular construction, therefore, a constant output pressure of 1,000 p.s.i. is maintained throughout the entire range of accumulator displacement from maximum displacement to zero.

In the two embodiments of the invention heretofore described and illustrated, both cylinder walls engaged by the respective seals were tapered in order to control the differential compression output by varying the differential area. It will be understood that the same effect can be achieved by tapering the walls of only one of the cylinders, so that the area of only one of the liquid spring seals changes. If a constant force spring is desired, the area of one of the liquid spring seals is varied sufficiently to maintain the product of differential area times liquid spring pressure a constant throughout the stroke of the spring.

If only one cylinder wall is to be tapered, it has been found desirable to taper the wall of the cylinder in engagement with the seal carried by the nose portion of the tubular piston, in other words, the bore 22 of the embodiment of FIGURES 1 and 2, or the bore 56 of the embodiment of FIGURES 4 and 5. This is because the nose portion of the tubular piston itself tends to expand under the extremely high pressures involved, making it easier for the seal carried by the nose portion to follow the tapered wall of the cylinder.

In both embodiments of the invention the output patterns can be altered with infinite variety. The output patterns need not be straight line relationships but can be curves of any desired shape, or combinations of curves and straight lines. If desired, negative rate springs can be provided, that is, ones in which the spring force or accumulator pressure decreases with increase in deflection. The only limitation is imposed by the difficulty of producing more complicated cylinder wall tapers and by the capacity of the liquid spring seals to follow the tapered walls without leakage. Herein and in the claims "taper" and "tapered" are used in the sense of any curved, straight or combination curved and straight profile, or in other words, any profile other than cylindrical.

Aside from the variable differential area principle involved in the embodiment of FIGURES 4 and 5, the concept of using the space ahead of the fixed piston head in a standard differential area liquid spring as an accumulator chamber area, by arranging the differential areas to achieve tension rather than compression, is in itself an important feature. This provides a very compact and efficient accumulator construction which can be readily produced from a standard production model differential area liquid spring with very little modification.

Variations and modifications may be effected without departing from the scope of the novel concepts of the present invention.

I claim:

1. A compressible liquid device comprising differential area piston mechanism including at least one piston chamber, a taper formed in the wall of said piston chamber, and radially expandable and compressible seal means operatively associated with said piston mechanism and reciprocably disposed in sealing relation with the tapered wall of said piston chamber whereby the swept area of said seal means varies with the stroke of said piston mechanism to vary the differential area of the piston mechanism.

2. A compressible liquid device comprising collapsible mechanism including a casing having two pistons reciprocable in opposite directions, a compressible liquid contained by said mechanism in said casing between said pistons, sliding male seal members in said casing carried by said pistons for preventing bypass of said liquid past said pistons and for changing the volume of the liquid in response to relative movement between the pistons to differentially compress the liquid, one of said sliding seal members being radially expandable and compressible and disposed in slidable sealing engagement with the wall of said casing, and a taper formed in the wall of the casing engaged by said one sliding seal member whereby the swept area of said one sliding seal member varies with the stroke of the pistons to vary the differential compression of the liquid with the stroke.

3. A compressible liquid device comprisng a casing, a tubular piston reciprocably disposed in said casing, a piston head disposed for reciprocation in said tubular piston, said tubular piston and said piston head being movable in opposite directions, a male seal secured to said piston head and slidably disposed against the inner wall of said tubular piston, radially expandable and compressible male seal secured to said tubular piston and slidably engaging the inner wall of said casing to provide an effective piston displacement per unit of lineal movement of the tubular piston between the two male seals which is different from the corresponding displacement volume of the piston for the same lineal movement, a taper formed on the inner wall of said casing whereby the swept area of the second named male seal varies with the stroke of said tubular piston to vary the effective piston displacement of the tubular piston with the stroke, and a compressible liquid completely filling the space in said casing and said tubular piston between said male seals.

4. A compressible liquid device comprising a casing, a tubular piston having two portion at least one of which is reciprocably disposed in said casing, piston means carrying sliding seal means operatively associated with the inner surface of one of said portions, sliding seal means carried by said tubular piston and operatively associated with the inner surface of said casing to provide an effective piston displacement per unit of lineal movement of the tubular piston between the two sliding seal means which is different from the corresponding displacement volume of the piston for the same lineal movement, a taper formed in at least one of said inner surfaces to vary the diameter of the swept area of at least one of said sliding seal means with the stroke of the device, and a compressible liquid completely filling the space in said casing and said tubular piston between said sliding seal means.

5. A compressible liquid accumulator comprising collapsible mechanism including a casing having two pistons reciprocable in opposite directions, a compressible liquid contained by said mechanism in said casing between said pistons, sliding seal members carried by said pistons for preventing bypass of liquid past said pistons and for changing the volume of the liquid in response to the relative movement between the pistons to differentially compress the liquid, an accumulator chamber secured to one of said pistons and reciprocably receiving the other of said pistons with the sliding seal member carried by said other piston excluding said compressible liquid from said accumulator chamber, and means accommodating introduction of fluid pressure into said accumulator chamber to cause relative movement between said pistons to compress said compressible liquid.

6. A compressible liquid accumulator comprising a casing, a tubular piston reciprocably disposed in said casing, a piston head disposed for reciprocation in said tubular piston, said tubular piston and said piston head being movable in opposite directions, a male seal secured to said piston head and slidably disposed against the inner wall of said tubular piston, a male seal secured to said tubular piston and slidably engaging the inner wall of said casing to provide an effective piston displacement per unit of lineal movement of the tubular piston between the two male seals which is different from the corresponding displacement volume of the tubular piston for the same lineal movement, a compressible liquid completely filling the space in said casing and said tubular piston between said male seals, said piston head and said tubular piston defining an accumulator chamber with said first-named seal excluding said compressible liquid from said chamber, and means accommodating introduction of fluid pressure into said accumulator chamber for causing relative movement between said piston head and said tubular piston to compress said compressible liquid.

7. A compressible liquid accumulator according to claim 6 including means for varying the effective piston displacement with lineal movement of the tubular piston.

8. A compressible liquid device comprising a casing having an internal piston chamber, a tubular piston reciprocably disposed in said piston chamber, said tubular piston having an internal piston chamber of different cross-sectional area than the piston chamber of said casing, a piston head reciprocably disposed in said piston chamber of said tubular piston, means fixedly secured to said piston head to said casing, sliding seal means disposed between said tubular piston and the wall of the piston chamber of said casing, sliding seal means disposed between said piston head and the wall of the piston chamber of said tubular piston, a compressible liquid completely filling the space in said casing and in said tubular piston between said sliding seal means, and a taper formed on the wall of at least one of said piston chambers, said taper being of a magnitude sufficient to vary the swept area of said sliding seal means to maintain the force caused by compression of said compressible liquid between said piston head and said tubular piston substantially equal throughout the range of relative movement of the tubular piston relative to the casing.

9. A compressible liquid device according to claim 8 wherein said piston head defines an accumulator chamber in the piston chamber of said tubular piston on the opposite side of said sliding seal means from said compressible liquid, and means for accommodating introduction of fluid pressure into said accumulator chamber to cause relative movement between said piston head and said tubular piston to compress said compressible liquid.

References Cited by the Examiner

UNITED STATES PATENTS

| | | | |
|---|---|---|---|
| 2,797,708 | 7/1957 | Treseder | 138—31 |
| 2,909,368 | 10/1959 | Taylor. | |
| 3,073,586 | 1/1963 | Hartel | 267—64 |
| 3,147,826 | 9/1964 | McHenry | 267—64 X |

LAVERNE D. GEIGER, *Primary Examiner.*

T. L. MOORHEAD, *Assistant Examiner.*